United States Patent [19]
Tsubusaki et al.

[11] Patent Number: 5,555,319
[45] Date of Patent: Sep. 10, 1996

[54] CRITICAL DIMENSION MEASURING METHOD AND EQUIPMENT THEREOF

[75] Inventors: Koji Tsubusaki, Kanagawa-ken; Fumio Komatsu, Tokyo, both of Japan

[73] Assignee: Kabushiki Kaisha Toshiba, Kawasaki, Japan

[21] Appl. No.: 237,169

[22] Filed: May 3, 1994

[30] Foreign Application Priority Data

May 6, 1993 [JP] Japan .................... 5-105492

[51] Int. Cl.$^6$ .................................... G06K 9/00
[52] U.S. Cl. .................................... 382/170; 382/286
[58] Field of Search .................... 382/145, 203, 382/168, 169, 170; 250/311, 492.2; 356/379; 364/564

[56] References Cited

U.S. PATENT DOCUMENTS

| | | | |
|---|---|---|---|
| 4,894,540 | 1/1990 | Komatsu | 250/307 |
| 5,164,993 | 11/1992 | Capozzi et al. | 382/6 |
| 5,189,711 | 2/1993 | Weiss et al. | 382/25 |

Primary Examiner—Joseph Mancuso
Attorney, Agent, or Firm—Oblon, Spivak, McClelland, Maier & Neustadt, P.C.

[57] ABSTRACT

A critical dimension measuring equipment includes a filtering circuit for inputting image data from a SEM and performs spatial filtering processing of the image data, a histogram processing circuit implements histogram processing of the image data, a threshold value detection circuit obtains a threshold value based on a discriminant criteria method, a three-value conversion processing circuits implements three-value conversion of the image data based on the threshold value, a first calculation circuit obtains the area and perimeter of the bottom section of the pattern based on this data, a second calculation circuit obtains the diameters of the patterns based on this data, and a critical shape recognition circuit decide whether the pattern is circular or elliptical based on the critical diameter, calculates the diameter of the circle based on the area if the pattern is circular, and calculating the major axis and the minor axis of the ellipse based on the area and the perimeter if the pattern is elliptical.

3 Claims, 4 Drawing Sheets

ORIGINAL SEM IMAGE

SPATIAL FILTERING PROCESSING

HISTOGRAM PROCESSING

THREE-VALUE CONVERSION PROCESSING

CRITICAL DIMENSION MEASURING METHOD AND EQUIPMENT THEREOF

BACKGROUND OF THE INVENTION

1. Field of the Invention

The present invention relates to an image processing method for a Scanning Electron Microscopy (SEM) image and to a critical dimension measuring method for a pattern obtained by detecting secondary electrons and reflected electrons from the pattern, as well as to a critical dimension measuring equipment, and, in particular, to a critical dimension measuring method and equipment, wherein, when measuring the critical dimensions of a finely detailed pattern or the like in a VLSI manufacturing process, if the measured pattern is either circular or elliptical the diameter, major axis, and minor axis are measured automatically with high precision and a judgment as to whether the measured pattern is circular or elliptical is made automatically, so that the precision of the measurement and the operation of measuring the critical dimensions are improved.

2. Description of the Prior Art

Conventionally, a pattern recognition method and a pattern measurement method using an electronic beam are utilized for measuring the critical dimensions of finely detailed patterns during a process for manufacturing Very Large Scale Integrations (VLSIs) and the like. At this time, the electron optics parameters are set at a low acceleration voltage (1 kV or less) and a low beam current (10 pA or less) with the object of reducing irradiation damage to the sample and preventing charge-up.

In addition, a frame integration processing or a spatial filtering processing or the like is performed to improve the S/N ratio of the resulting SEM image.

Furthermore, various algorithms for dimension measurement (for example, a threshold value method, linear regression method, maximum differential method, or the like) are used, and finely detailed critical dimension measurement is carried out based on the SEM image obtained in this manner.

In a VLSI manufacturing process, if the pattern is line-shaped, it is possible to obtain a measurement repeatability of 0.01 μm or less with such conventional measurement methods. However, under present conditions, not only are the design rules for the design data very detailed, but, even if the pattern is square or rectangular, it is treated as a circular or an elliptical shape in a lithography process.

When the critical dimensions for a circle or an ellipse are measured in this manner, the diameter is measured in the case of a circle, and the major axis or minor axis dimension is measured in the case of an ellipse.

Conventionally, when critical dimensions are measured for such circles or ellipses, the following problem areas are encountered.

First, in the case of a circle, in judging the diameter, profile data for any line part in the diametrical direction of the circle is extracted and the dimensions are measured, for each line. The maximum value is normally taken as the diameter. The repeatability of the measurement is good because it is possible to average the profile data for any part of the line for a line shape.

However, with a circle, the profile data for the lines cannot be adequately averaged because it is necessary to measure the dimensions of each line. Therefore the deviation in the dimensional values cannot be disregarded and in practice there is a problem as to whether the average value corresponds to the diameter.

In the case of an ellipse, the major axis direction or the minor axis direction must agree with the beam scanning direction. If the pattern is sufficiently large it is possible that these directions can be made to agree, but with a finely detailed critical there are many cases in which such agreement is extremely difficult. Specifically, the operability is poor. Accordingly, there is a high possibility of erroneous measurement so that the major axis dimension is too short or the minor axis dimension is too long. In the same manner, in the case of a circle it is not possible to average the data for each line, therefore the deviation in the measurements cannot be disregarded.

As outlined above, with a conventional critical dimension measurement equipment and method:

(1) When the measured pattern is circular, the dimensions of every line must be measured, and when compared with a straight line pattern, the deviation of the dimension values cannot be disregarded because the data for each line cannot be adequately averaged.

(2) When the measured pattern is elliptical, the major axis direction or the minor axis direction must conform to the beam scanning direction. With a finely detailed pattern there are many cases in which it is extremely difficult to obtain such agreement. There is therefore a high possibility of erroneous measurement whereby the major axis dimension is too short or the minor axis dimension is too long. In the same manner as in the case of a circle as outlined above, it is not possible to average the data for each line, therefore the deviation in the measurements cannot be disregarded.

SUMMARY OF THE INVENTION

An object of the present invention is, with due consideration to the drawbacks of such conventional critical dimension measuring equipments, to provide a critical dimension measuring equipment and method wherein, when the measured pattern is either circular or elliptical, the diameter, major axis, and minor axis are measured automatically with high precision, and a judgment as to whether the measured pattern is circular or elliptical is made automatically, so that the precision of the measurement and the measuring operation when measuring the critical dimensions are improved.

A critical dimension measuring equipment as a preferred embodiment according to the present invention, comprises:

irradiating means for irradiating electron beam onto a measured pattern;

detecting means for detecting secondary and reflected electrons from the measured pattern;

filtering means for inputting image data of the secondary and reflected electrons obtained from the detecting means and implementing spatial filtering processing of this image data and storing the results in a first memory;

histogram processing means for inputting image data after spatial filtering processing stored in the first memory, implementing histogram processing of this image data, and storing the results in a second memory;

threshold value detection means for inputting the results of the histogram processing stored in the second memory, obtaining a threshold value by automatically separating classes in the histogram obtained by the histogram processing based on a discriminant criteria method, and storing the results in a third memory;

three-value conversion processing means for inputting the threshold value stored in the third memory, implementing three-value conversion of the image data stored in the first memory obtained after spatial filtering processing based on the threshold value, and storing the results in a fourth memory;

first calculation means for inputting image data stored in the fourth memory obtained after three-value conversion processing, obtaining the area and perimeter of the bottom section of the pattern based on this data, and storing the results in a fifth memory;

second calculation means for inputting the area and the perimeter of the bottom section of the pattern stored in the fifth memory, obtaining the diameters of the patterns based on this data, and storing the results in a sixth memory; and pattern shape recognition means for automatically deciding whether the pattern is circular or elliptical based on the pattern diameter stored in the sixth memory, calculating the diameter of the circle based on the area if the pattern is circular, and calculating the major axis and the minor axis of the ellipse based on the area and the perimeter if the pattern is elliptical.

A critical dimension measuring method as another preferred embodiment according to the present invention, comprises:

a first process for spatial filtering processing of Scanning Electron Microscope (SEM) image data obtained by scanning electron beam on a pattern to be measured;

a second process for histogram processing of image data after spatial filtering processing;

a third process for obtaining a threshold value by automatically separating classes obtained by the histogram processing based on a discriminant criteria method;

a fourth process for three-value conversion of the image data after spatial filtering processing based on the threshold value;

a fifth process for obtaining the area and perimeter of the bottom section of the pattern based on the image data after the three-value conversion process;

a sixth process for obtaining the diameters of the patterns based on the area and perimeter of the bottom section of the pattern and a seventh process for automatically deciding whether the pattern is circular or elliptical based on the pattern diameter, calculating the diameter of the circle based on the area if the pattern is circular, and calculating the major axis and the minor axis of the ellipse based on the area and the perimeter if the pattern is elliptical.

In the critical dimension measuring equipment as described above, wherein the critical shape recognition means decides whether the pattern is circular or elliptical by using the rate (d1/d2) between a pattern radii (d1) obtained from the area of the pattern and a critical radii (d2) obtained from the perimeter of the bottom section of the pattern stored in the fifth memory.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Embodiments of the critical dimension measuring method and equipment according to the present invention will now be explained with reference to the drawings.

Figure 1:
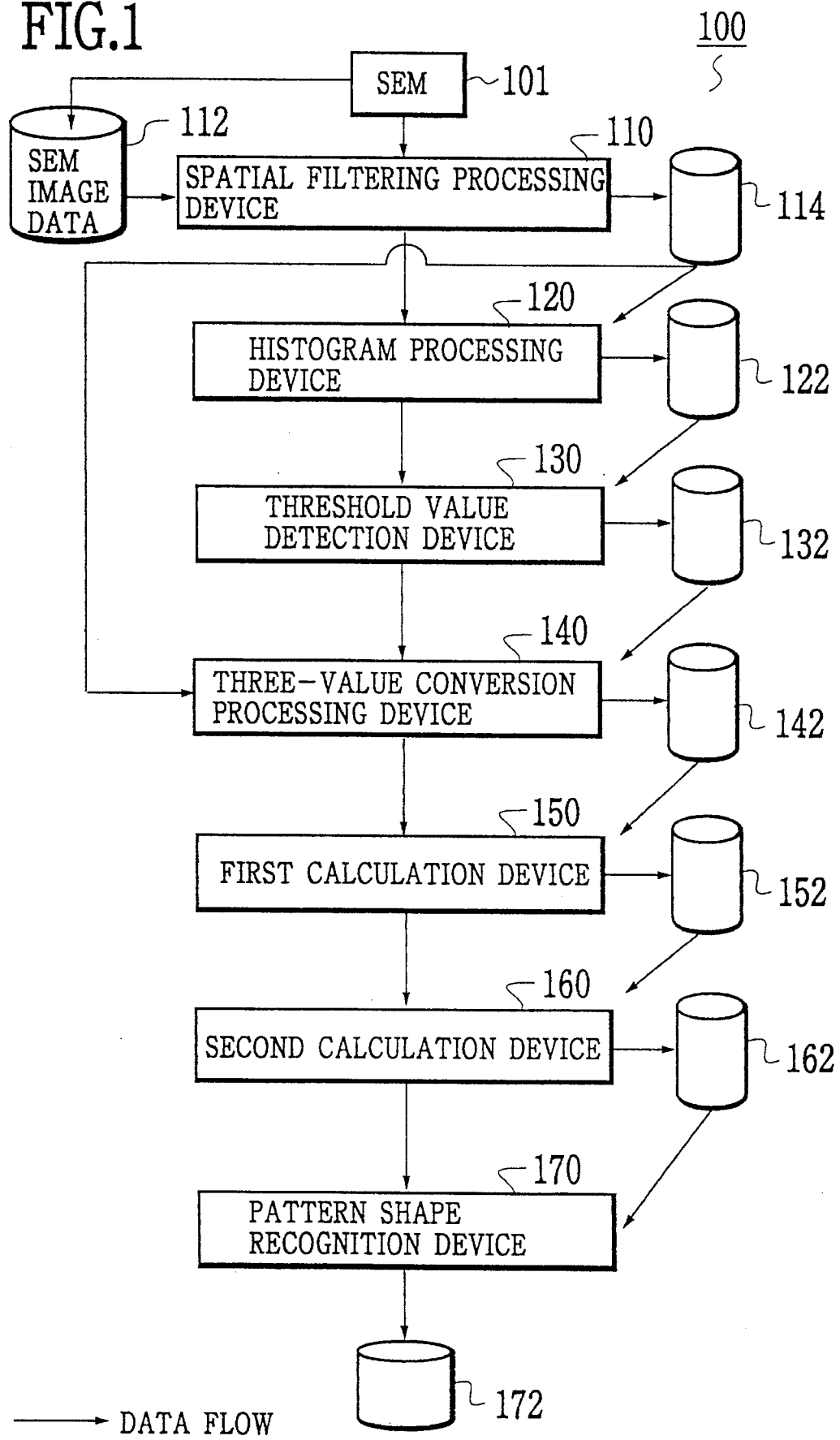
FIG. 1 is a configuration diagram of a critical dimension measuring equipment as a preferred embodiment according to the present invention.

FIG. 1 is a configuration diagram of a preferred embodiment of a critical dimension measuring equipment of the present invention.

A critical dimension measuring equipment of the present invention includes a Scanning Electron Microscopy (SEM) 101, a spatial filtering processing device 110, a histogram processing device 120, a threshold value detection device 130, a three-value conversion processing device 140, a first calculation device 150, a second calculation device 160, a pattern shape recognition device 170, and memories 112, 114, 122, 132, 142, 152, 162, and 172.

The spatial filtering processing device 110 inputs SEM image data stored in the memory 112. The image data stored in the memory 112 is obtained by scanning a pattern to be measured with electron beam (for example, by a Scanning Electron Measuring device (SEM) 101 shown in FIG. 1) and implements spatial filtering processing of this data. The result of the spatial filtering processing is stored in the memory 114.

The histogram processing device 120 implements histogram processing of the image data stored in the memory 114 after spatial filtering processing and output the result of the histogram processing into the memory 122.

The threshold value detection device 130 obtains automatically a threshold value based on the results of the histogram processing stored in the memory 122 and by using a discriminant criteria method and outputs the result of the threshold value into the memory 132.

The three-value conversion processing device 140 implements three-value conversion of the image data stored in the memory 114 obtained after spatial filtering processing based on the threshold value stored in the memory 132.

The first calculation device 150 obtains the area and perimeter of the bottom section of the pattern based on the image data stored in the memory 142 obtained after three-value conversion. The area and the perimeter of the pattern is stored in the memory 152.

The second calculation device 160 obtains the diameters of the patterns based on the area and the perimeter of the bottom section of the pattern stored in the memory 152. The diameters and the perimeter are output into the memory 162.

The pattern shape recognition equipment 170 automatically decide whether the pattern is circular or elliptical based on the critical diameter stored in the memory 162, and calculate the diameter of the circle based on the area if the pattern is circular, and calculating the major axis and the minor axis of the ellipse based on the area and the perimeter stored in the memory 162 if the pattern is elliptical.

Figure 2:
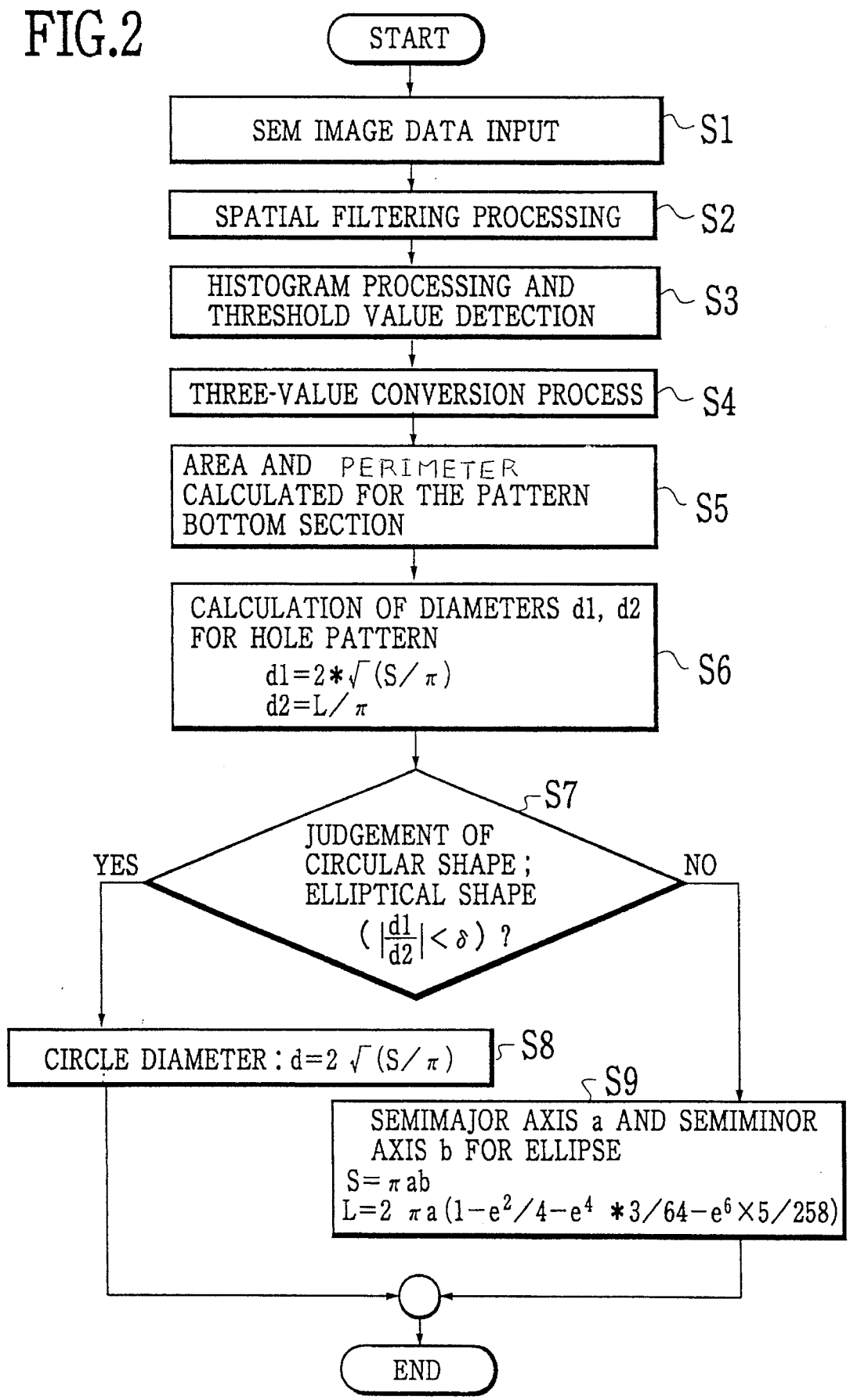
FIG. 2 is a flow chart for explaining the operating procedures of a critical dimension measuring method for the critical dimension measuring equipment illustrated in FIG. 1.

FIG. 2 is a flow chart showing the operating procedures for a critical dimension measuring method used by the critical dimension measuring equipment shown in FIG. 1.

For this embodiment the object of the measurement is a circular pattern shown in FIG. 1.

First, in Step S1, SEM image data obtained by scanning a pattern to be measured with electron beam (for example, by a Scanning Electron Measuring device (SEM) 101 shown in FIG. 1) is output to the frame memory 112 which is built into the critical dimension measuring equipment.

The SEM image in the memory 112 is a multivalued image made up, for example, of 256 gradations. The SEM image data is subjected to a spatial filtering processing by the filtering device 110 (Step S2). This is to ensure the implementation of a histogram processing and a three-value conversion processing, later-described. A 3×3 picture element matrix or a 5×5 picture element matrix is adopted as the filter matrix.

In Step S3, a histogram process is performed on the image data after spatial filtering processing by the histogram processing device 120, and the frequency distribution of the image data values corresponding to a pattern surface section, a pattern tapered section, and a pattern bottom section is examined throughout an observed image. Also, in Step S3, a threshold value is obtained automatically based on the discriminant criteria method by the threshold value detection device 130.

Specifically, a gray level corresponding to the boundary (neighboring minimum value) each section (a bottom section, a taper section, and a surface section) of the circular pattern from the histogram shown in FIG. 4 is detected and taken as the threshold value for the three-value conversion process.

In Step 4, the three-value conversion process is performed on the image data after spatial filtering processing based on the threshold value by the three-value conversion processing device 140.

Figure 3A:
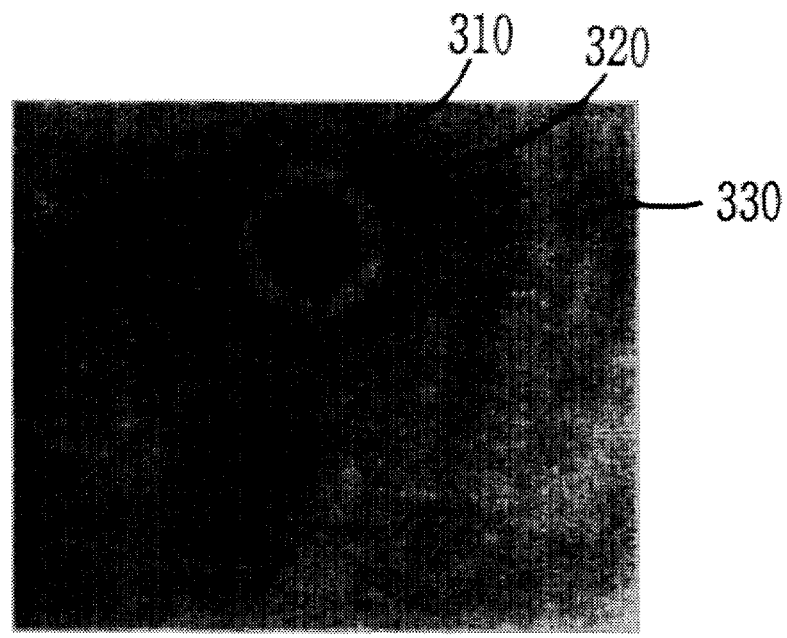
FIG. 3A is a diagram for explaining an original image (SEM image) which is input to the critical dimension measuring equipment shown in FIG. 1 of the present invention.
Figure 4A:
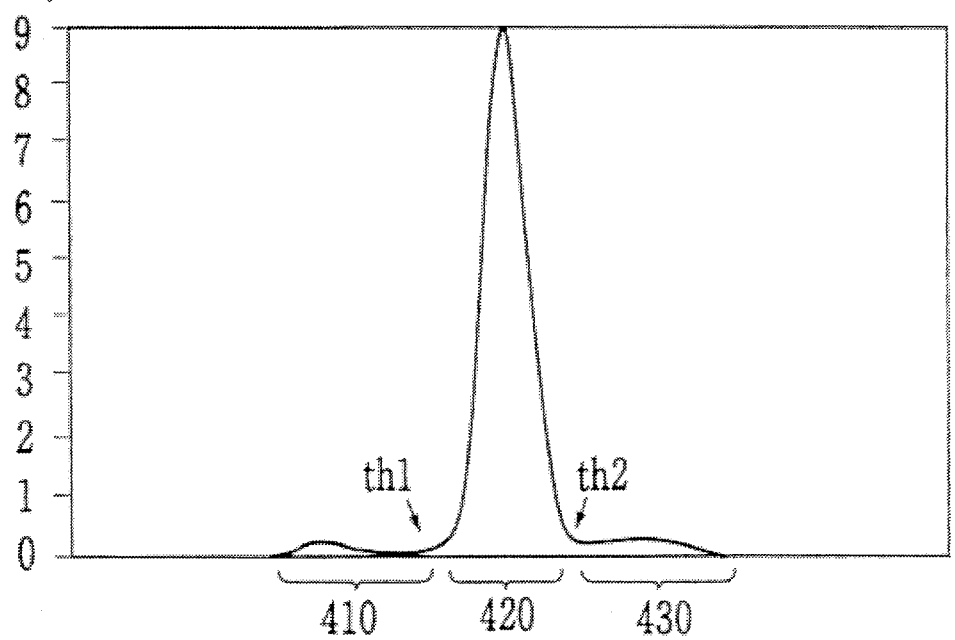
FIG. 4A is a diagram for explaining the results of histogram processing of a spatial filtering processed image.

In FIG. 3A the reference numeral 310 designates a bottom section of a pattern the reference numeral 320 designates a tapered section; and the reference numeral 330 designates a section of-a surface section which is not formed in a circular pattern. In FIG. 4A, the reference numeral 410 designates the bottom section 310, the reference numeral 420 designates the surface section 330, and the reference numeral 430 designates the taper section 320.

Next, in Step S5, the boundary between the pattern tapered section and the pattern bottom section is recognized from the image data after the three-value conversion process by the first calculation device 150 and the number of picture elements s and l is obtained for the area and perimeter of the pattern bottom section. Also, the pixel size p [m/pix] of one pixel element is calculated from these observed conditions, and the area S and the perimeter L of the pattern bottom section are obtained from the following Equation (1).

$$S=p\times s[\mu m^2], \ L=p\times l[\mu m] \quad (1)$$

In Step S6, the radii (d1; d2) of the various measured patterns are obtained from the following equation (2) based on the area S and the perimeter L of the pattern bottom section using the second calculation device 160, $$S=\pi d1^2 \ L=2\pi d2 \quad (2)$$

In Step S7, a judgement is made automatically as to whether the measured patterns are circular or elliptical based on the pattern radii (d1 and d2) by the pattern shape recognition equipment 170. If it is circular, the diameter d of the circle is calculated in Step 8 based on the area value S. If it is elliptical, the major axis 2a and the minor axis 2b of the ellipse are calculated in Step 8 based on the area value S and the perimeter L.

Specifically, if the difference δ (d1/d2) between the radius d1 and the radius d2 is within a set value d (for example, d=0.9), the measured pattern is judged to be circular and the diameter d of the circle is obtained from the following Equation (3), $$d=2\times(S/\pi)^{1/2} \quad (3)$$

If the difference between the radius d1 and the radius d2 is greater than the set value δ (d1/d2), the measured pattern is judged to be elliptical, and the major axis 2a and the minor axis 2b are obtained from the following Equation (4), $$S=\pi ab,$$

$$L=2\pi a-2\pi ae^2/4-2\pi ae^4\times 3/64-2\pi ae^6\times 5/256 \quad (4)$$

where a: major axis, b: minor axis, and e: eccentricity.

When the major axis 2a and the minor axis 2b are obtained from Equation (4), the long side and the short side in the pattern data may be compared to give an initial value for the eccentricity "e" using the Newton-Raphson method or the Bailey method.

In this manner it is possible to determine automatically whether the measured pattern is circular or elliptical. In addition, in the case where the measured pattern is elliptical it is not necessary for the major axis direction or the minor axis direction to conform to the scanning direction of the electronic beam. As a result, the precision of the measurement of the critical dimensions is improved and the operation of measuring critical dimensions are also improved.

FIGS. 3A and 3B and FIGS. 4A and 4B show the results of the processes used in the critical dimension measuring method of the present invention. In these drawings, the sample is a hole pattern of the resist in a trench process. The measurement conditions for a SEM (scanning electron microscope) to measure the circular pattern are an acceleration voltage of 0.8 [kV], a beam current of 3 [pA], and an observation magnification of x50 k.

FIG. 3A shows an original image (SEM image for a circular pattern) which is obtained by a SEM.

Figure 3B:
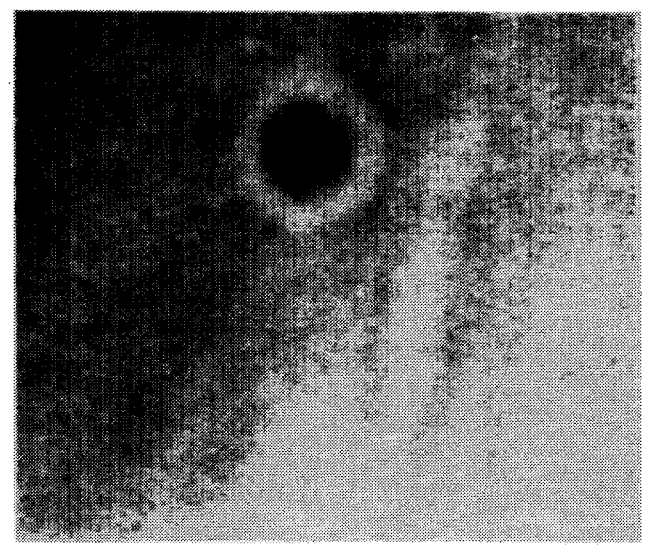
FIG. 3B is a diagram for explaining images resulting from spatial filtering processing of input images shown in FIG. 3A.

FIG. 3B shows an image resulting from spatial filtering processing of this input image.

FIG. 4A illustrates the results of performing a histogram processing on a spatially filtering processing image. The region 410 that has the peak at low gray level corresponds to the pattern bottom section 310; the region 420 that has the shape peak at medium gray level corresponds to the resist surface section 330; and the region 430 that has the peak at high gray level corresponds to the resist tapered section 320.

Threshold values th1 and th2 are detected from the results of this histogram, as shown in FIG. 4A.

Figure 4B:
FIG. 4B is a diagram for explaining the results of three-value conversion of a spatially filtering processed image based on a threshold value.

FIG. 4B illustrates the results of three-value conversion processing of the spatially filtered image based on the threshold values th1 and th2. The area S and the perimeter L of the pattern bottom section are obtained from FIG. 4B.

In this example, S=0.7115 m$^2$ and L=3.0396 m. As a result, the values of the pattern radii (d1; d2) are respectively d1=0.476 m, d2=0.484 m, so that (d1/d2)<0.9.

The measured pattern is therefore judged to be a circle.

By means of the embodiment of the critical dimension measuring equipment outlined in the foregoing, the diameter, major axis, and minor axis can be measured automatically with high precision for circles and ellipses, and a judgment made automatically as to whether the measured pattern is circular or elliptical.

In addition, when the measured pattern is elliptical, it is not necessary for the major axis direction or the minor axis direction to conform to the scanning direction of the electron beam, therefore, measurement deviations caused by deviations in direction are disregarded. As a result, the precision of the measurement of the critical dimensions is improved and the operation of measuring the critical dimension is also improved.

Various modifications will become possible for those skilled in the art after receiving the teachings of the present disclosure without departing from the scope thereof.

What is claimed is:

1. Critical dimension measuring equipment comprising:

irradiating means for irradiating an electron beam onto a measured pattern to be measured;

detecting means for detecting a secondary and reflected electron reflected from the measured pattern;

filtering means for receiving image data as the secondary and reflected electron detected by the detecting means and implementing a spatial filtering processing of the image data and storing the result of the spatial filtering processing into a first memory;

histogram processing means for receiving the image data which been obtained after the spatial filtering processing stored in the first memory, implementing histogram processing of the image data, and storing the result of the histogram processing into a second memory;

threshold value detection means for receiving the result of the histogram processing stored in the second memory, generating a threshold value by automatically separating classes in a histogram obtained by the histogram processing based on the discriminant criteria method, and storing the result generated by the threshold value detection means into a third memory;

three-value conversion processing means for receiving the threshold value stored in the third memory, implementing three-value conversion of the image data stored in the first memory obtained after spatial filtering processing based on the threshold value, and storing the result obtained by the three-value conversion means into a fourth memory;

first calculation means for receiving image data stored in the fourth memory obtained after three-value conversion processing, obtaining the area and perimeter of the bottom section of the pattern based on this data, and storing the result obtained by the first calculation means into a fifth memory;

second calculation means for receiving the area and the perimeter of the bottom section of the pattern stored in the fifth memory, obtaining the diameters of the patterns based on this data, and storing the result obtained by the second calculation means into a sixth memory; and pattern shape recognition means for automatically deciding whether the pattern is circular or elliptical based on the pattern diameter stored in the sixth memory, calculating the diameter of the circle based on the area if the pattern is circular, and calculating a major axis and a minor axis of the ellipse based on the area and the perimeter if the pattern is elliptical.

2. The critical dimension measuring equipment as claimed in claim 1, wherein the pattern shape recognition means decides whether the pattern is a circle shape or an elliptical shape by using a rate (d1/d2) of a pattern radius (d1) obtained from the area of the pattern stored in the fifth memory and a critical radius (d2) obtained from a perimeter of a bottom section of the pattern stored in the fifth memory.

3. A critical dimension measuring method comprising:

a first process for performing a spatial filtering processing of Scanning Electron Microscope (SEM) image data obtained by a scanning electron beam on a pattern to be measured;

a second process for performing a histogram processing of image data obtained after spatial filtering processing;

a third process for obtaining a threshold value by automatically separating classes obtained by the histogram processing based on a discriminant criteria method;

a fourth process for performing a three-value conversion of the image data obtained after spatial filtering processing based on the threshold value;

a fifth process for obtaining the area and perimeter of the bottom section of the pattern based on the image data obtained after the three-value conversion process;

a sixth process for obtaining the diameters of the patterns based on the area and perimeter of the bottom section of the pattern; and a seventh process for automatically deciding whether the pattern is circular or elliptical based on the pattern diameter, calculating the diameter of the circle based on the area if the pattern is circular, and calculating the major axis and the minor axis of the ellipse based on the area and the perimeter if the pattern is elliptical.

* * * * *